(12) United States Patent
Chakraborti et al.

(10) Patent No.: US 11,645,097 B2
(45) Date of Patent: May 9, 2023

(54) SYSTEM AND METHOD FOR THE ORCHESTRATION OF PLUGINS ON THE COMMAND LINE

(71) Applicant: INTERNATIONAL BUSINESS MACHINES CORPORATION, Armonk, NY (US)

(72) Inventors: Tathagata Chakraborti, Cambridge, MA (US); Mayank Agarwal, Somerville, MA (US); Zhongshen Zeng, Shenzhen (CN); Yasaman Khazaeni, Needham, MA (US); Sohini Upadhyay, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 17/183,744

(22) Filed: Feb. 24, 2021

(65) Prior Publication Data
US 2022/0269519 A1 Aug. 25, 2022

(51) Int. Cl.
*G06F 9/455* (2018.01)
*G06F 9/445* (2018.01)
*G06F 40/274* (2020.01)

(52) U.S. Cl.
CPC ...... *G06F 9/45512* (2013.01); *G06F 9/44526* (2013.01); *G06F 40/274* (2020.01)

(58) Field of Classification Search
CPC ..................... G06F 9/45512; G06F 9/44526
See application file for complete search history.

(56) References Cited

U.S. PATENT DOCUMENTS

2020/0142714 A1* 5/2020 Navarro .............. G06F 9/44526

OTHER PUBLICATIONS

Agarwal et al., "CLAI: A Platform for AI Skills on the Command Line" (Jan. 31, 2020), pp. 1-8 [retrieved from https://www.semanticscholar.org/reader/3c9fa66674e1053eb9de12076c48f13e46422c29]. (Year: 2020).*

(Continued)

*Primary Examiner* — Brian W Wathen
(74) *Attorney, Agent, or Firm* — F. Chau & Associates, LLC

(57) ABSTRACT

The present disclosure describes systems and methods for a command line interface with artificial intelligence integration. Embodiments of the disclosure provide a command line orchestration component (e.g., including a reinforcement learning model) that provides a generic command line interface environment (e.g., that researchers can interface using a simple sense-act application programming interface (API)). For instance, a command line orchestration component receives commands (e.g., text input) from a user via a command line interface, and the command line orchestration component can identify command line plugins and candidate response from the command line plugins. Further, the command line orchestration component may select a response from the candidate responses based on user preferences, user characteristics, etc., thus providing a generic command line interface environment for various users (e.g., including artificial intelligence developers and researchers).

17 Claims, 5 Drawing Sheets

(56) References Cited

OTHER PUBLICATIONS

Upadhyay et al., "A Bandit Approach to Posterior Dialog Orchestration Under a Budget" (Jun. 22, 2019), pp. 1-10 [retrieved from https://arxiv.org/pdf/1906.09384.pdf]. (Year: 2019).*

Papaioannou et al., "Alana: Social Dialogue using an Ensemble Model and a Ranker trained on User Feedback" (2017), pp. 1-10 [retrieved from https://assets.amazon.science/aa/72/7234adc844af99a3c57b0967b90f/social-dialogue-using-an-ensemble-model-and-a-ranker-trained-on-user-feedback.pdf]. (Year: 2017).*

Chakraborti et al., "UbuntuWorld 1.0 LTS—A Platform for Automated Problem Solving & Troubleshooting in the Ubuntu OS" (2017), pp. 1-7 [retrieved from https://rakaposhi.eas.asu.edu/ubuntuworld-iaai17.pdf]. (Year: 2017).*

Agarwal, et al., "Project CLAI: Instrumenting the Command Line as a New Environment for AI Agents", arXiv:2002.00762v2 {cs.HC] Jun. 17, 2020, 26 pages.

* cited by examiner

SYSTEM AND METHOD FOR THE ORCHESTRATION OF PLUGINS ON THE COMMAND LINE

BACKGROUND

The following relates generally to a command line interface, and more specifically to a command line interface with artificial intelligence integration.

Computing devices (e.g., such as personal computers, mobile devices, web servers, supercomputers, processing apparatus, etc.) may operate using an operating system that manages device resources (e.g., hardware and software resources) and enables device programs. The operating system of a device may act as an intermediary between device hardware and programs run on the device. For example, the operating system may manage hardware functions for executing various programs, such as memory allocation, input and output, etc.

Operating systems may implement a user interface that processes commands (i.e., text input), enables interaction with device programs, and that generally provides user access to services or functions of the operating system. Generally, user interfaces include command line interfaces (e.g., where users input text commands typed out line-by-line) and graphical user interfaces (e.g., where a visual environment is present). Recently, command line interfaces have gained popularity due to the speed and expressiveness of the command line. In some instances of recent trends in software development, graphical user interfaces have proved to not keep up with the rate of feature changes. Accordingly, the command line interface has, in many cases, become the preferred interfacing medium both for new adopters of a software as well as for experts in one domain (e.g., programming) who are no longer experts in others (e.g., devops).

However, with the emergence of the command line interface, support demands (e.g., informational or educational demands, service demands, training demands, etc.) have increased. Moreover, the growth of command line options has increased the complexity of command line interface commands. Due to the increase in support demands, both in terms of volume and complexity, community-sourced support may be insufficient in addressing user's needs. Therefore, there is a need in the art for improved on-premises support (e.g., such as CLI plugins) with easy user accessibility.

SUMMARY

The present disclosure describes systems and methods for a command line interface with artificial intelligence integration. Embodiments of the disclosure provide a command line orchestration component (e.g., including a reinforcement learning model) that provides a generic command line interface environment (e.g., that researchers can interface using a simple sense-act application programming interface (API)). For instance, a command line orchestration component receives commands (e.g., text input) from a user via a command line interface, and the command line orchestration component can identify command line plugins and candidate response from the command line plugins. Further, the command line orchestration component may select a response from the candidate responses based on user preferences, user characteristics, etc., thus providing a generic command line interface environment for various users (e.g., including artificial intelligence developers and researchers).

A method, apparatus, non-transitory computer readable medium, and system for a command line interface with artificial intelligence integration are described. Embodiments of the method, apparatus, non-transitory computer readable medium, and system are configured to receive a text input from a user via a command line interface, receive candidate responses to the text input from a plurality of command line plugins, select a response to the text input from among the candidate responses based on user preferences using a command line orchestration component comprising a reinforcement learning model, and respond to the input based on the selected response.

A method, apparatus, non-transitory computer readable medium, and system for a command line interface with artificial intelligence integration are described. Embodiments of the method, apparatus, non-transitory computer readable medium, and system are configured to a command line interface configured to receive text input from a user, a plurality of command line plugins configured to provided candidate responses to the text input, and a command line orchestration component configured to select a response to the text input from among the candidate responses based on user preferences.

A method, apparatus, non-transitory computer readable medium, and system for a command line interface with artificial intelligence integration are described. Embodiments of the method, apparatus, non-transitory computer readable medium, and system are configured to receive a text input from a training user via a command line interface, receive candidate responses to the text input from a plurality of command line plugins, select a response to the text input from among the candidate responses using a command line orchestration component comprising a reinforcement learning model, present the selected response to the user via the command line interface, receive feedback from the training user based on the presenting, and update parameters of the command line orchestration component based on the feedback.

DETAILED DESCRIPTION

Figure 1:
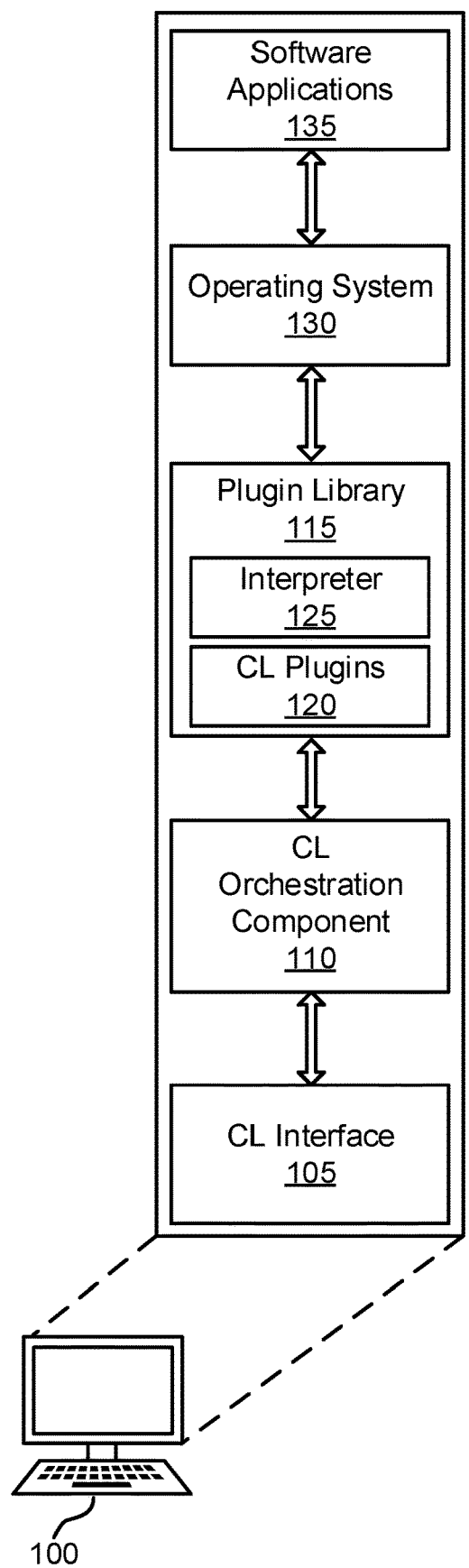
FIG. 1 shows an example of a command line interface system according to aspects of the present disclosure.

The present disclosure describes systems and methods for a command line interface with artificial intelligence integration. Embodiments of the disclosure provide a command line orchestration component (e.g., including a reinforcement learning model) that provides a generic command line interface environment. As a result, a range of users (e.g., from new adopters of a software through experts in a domain) can efficiently interface with a command line interface. For instance, artificial intelligence researchers and developers can interface with a command line interface using a simple sense-act application programming interface (API) (e.g., much like the traditional artificial intelligence agent architecture).

Recently, command line interfaces have gained popularity due to the speed and expressiveness of the command line.

Due to the emergence of the command line interface and the growth of command line options, user support demands have increased both in terms of volume and complexity. In some cases, rule-based command line assistants have emerged to address user support demands. Command line assistants generally deal with correcting misspelled commands and other common errors on the command line, as well as automating commonly performed tasks using predefined scripts. While these assistants may ease working with the command line, they may have a high maintenance burden due to the constant up-keep of the rules that form their back-end. Further, such domain specific solutions may not be scalable or generalized.

By contrast, embodiments of the present disclosure provide an improved command line interface that integrates artificial intelligence (e.g., via a command line orchestration component) to generalize the command line interface environment for various users. According to aspects of the present disclosure, artificial intelligence plugins (AI plugins), which include functions that perform microtasks, may monitor user actions on the command line interface. Commands that a user types, or any execution process on a command line interface, are piped through AI plugins active in the command line orchestration component. An AI plugin can thus autonomously respond to events on the command line interface.

By applying the unconventional steps of using AI plugins to provide candidate responses to events on a command line interface (e.g., such as a response to user text input on a command line interface) and using a command line orchestration component to select a response from among the candidate responses, a range of users can efficiently interface with a generalized command line interface based on user preferences, user characteristics, etc. Moreover, the command line orchestration component and pluggable AI plugins may enable an artificial intelligence integrated command line interface with low latency (e.g., responses in 3 seconds or less) that also may ultimately run on end terminals. Accordingly, users (e.g., new adopters of a software, AI developers, etc.) may not have to deal with interfacing issues and can instead focus on the task at hand (e.g., such as building AI plugins).

Embodiments of the present disclosure may be used in the context of a device command line (e.g., terminal). For example, a command line interface based on the present disclosure may integrate artificial intelligence via a command line orchestration component and command line plugins (e.g., AI plugins). An example of an application of the inventive concept in the command line context is provided with reference to FIG. 1. Examples of a processes for integrating artificial intelligence with command line interfaces are provided with reference to FIGS. 2 through 4. A description of an example training process is described with reference to FIG. 5.

Command Line Application

FIG. 1 shows an example of a computing system according to aspects of the present disclosure. The example shown includes device 100, command line interface 105 (CL interface 105), command line orchestration component 110 (CL orchestration component 110), plugin library 115, operating system 130, and software application 135. In some embodiments, a user may interface with an operating system 130 of device 100 via command line interface 105. Command line interface 105 may generally provide a user access to services or functions of the operating system 130 as well as other aspects of device 100.

As described herein, command line interface 105 integrates artificial intelligence (e.g., via command line orchestration component 110 and command line plugins 120). Command line orchestration component 110 may include a reinforcement learning model that provides a generic command line interface environment (e.g., that researchers can interface using a simple sense-act API). For instance, a command line orchestration component 110 receives commands (e.g., text input) from a user via a command line interface 105, and the command line orchestration component 110 can identify command line plugins 120 and candidate responses from the command line plugins 120. Further, the command line orchestration component 110 may select a response from the candidate responses based on user preferences, user characteristics, etc., thus providing a generic command line interface environment for various users (e.g., including artificial intelligence developers and researchers).

The user device 100 may be a personal computer, laptop computer, mainframe computer, palmtop computer, personal assistant, mobile device, or any other suitable processing apparatus. According to some embodiments, device 100 identifies one or more user characteristics. In some examples, device 100 selects the command line orchestration component 110 from among a set of pre-trained models based on the user characteristics. In some examples, the pre-trained models include at least one power user model and at least one casual user model.

According to some embodiments, command line interface 105 receives a text input from a user via a command line interface 105. In some examples, command line interface 105 prompts the user to accept or reject the selected response. In some examples, command line interface 105 receives an indication from the user based on the prompting, where the responding is based on the indication. In some examples, a command line interface 105 is configured to receive text input from a user. In some cases, a command line interface 105 may include or be referred to as a terminal.

In some examples, command line orchestration component 110 includes a computer implemented network. In some examples, the command line orchestration component 110 may be referred to or may include an orchestration layer. In some examples, the command line orchestration component 110 may be referred to as command line artificial intelligence (CLAI). In some examples, the command line orchestration component 110 may include a processor unit, a memory unit, a user interface, and a training component. The training component may be used, for example, to train an encoder of the command line orchestration component 110. Additionally, in some cases, the command line orchestration component 110 can communicate with a database via a cloud.

In some embodiments, the command line orchestration component 110 includes an artificial neural network. An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function that corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, a training component is used to train the encoder of the command line orchestration component 110. A loss function is used during the training and the parameters of the encoder are iteratively updated based on the comparison. After training, the trained encoder is used to select a response to user input (e.g., text input) from among candidate responses based on user preferences, as described herein.

As described herein, command line orchestration component 110 may comprise a reinforcement learning model. Reinforcement learning is one of three machine learning paradigms, alongside supervised learning and unsupervised learning. Specifically, reinforcement learning relates to how software agents make decisions in order to maximize a reward. The decision making model may be referred to as a policy. This type of learning differs from supervised learning in that labeled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical.

According to some embodiments, command line orchestration component 110 receives candidate responses to the text input from a set of command line plugins. In some examples, command line orchestration component 110 identifies the command line plugins. In some examples, command line orchestration component 110 transmits the text input to each of the command line plugins. In some examples, command line orchestration component 110 identifies the command line plugins from a set of installed command line plugins. In some examples, command line orchestration component 110 refrains from transmitting the text input to at least one of the installed command line plugins. In some examples, command line orchestration component 110 presents the selected response to the user as a text response via the command line interface 105. In some examples, command line orchestration component 110 identifies a software program based on the selected response. In some examples, command line orchestration component 110 executes the software program.

In some examples, a command line orchestration component 110 is configured to select a response to the text input from among the candidate responses based on user preferences. In some examples, the command line orchestration component 110 includes a reinforcement learning model. In some examples, the command line orchestration component 110 is configured to prompt the user to accept or reject the selected response, where parameters of the command line orchestration component 110 are fine-tuned based on the prompting.

In one embodiment, plugin library 115 includes command line plugins 120 (CL plugins 120) and interpreter 125. In some cases, command line plugins 120 may be referred to herein as AI plugins or skills. In some examples, command line plugins 120 may execute scripts on operating system 130. Interpreter 125 may expose (e.g., determine, indicate, execute, etc.) functions of operating system 130 based on user input (e.g., based on user text input to command line interface 105). Command line plugins 120 may also expose (e.g., determine, indicate, execute, etc.) functions of operating system 130 based on user input. However, according to some embodiments, command line plugins 120 use artificial intelligence and may expose functions other than functions of the operating system 130.

Device 100 may operate according to an operating system 130. The operating system 130 is system software that manages device resources (e.g., hardware and software resources, such as software applications 135) and enables device programs. For example, the operating system 130 of device 100 may act as an intermediary between device hardware and programs run on the device 100. The operating system 130 may manage hardware functions for executing various programs, such as memory allocation, input and output, etc.

Software applications 135 may include a program or a group of programs designed for and usable by a user of device 100. Examples of Software applications 135 may include web browsers, email clients, word processors, media players, media editors, spreadsheets, etc. Software applications 135 may include code to implement aspects of the present disclosure. Software applications 135 may be stored in a non-transitory computer-readable medium such as system memory or other memory. In some cases, the software applications 135 may not be directly executable by a processor but may cause device 100 (e.g., when compiled and executed) to perform functions described herein.

As an example, a dialog system may receive speech input and may output an action. After executing the action, the system receives feedback from an environment or a user and utilizes the feedback to update the models. Methods for Orchestration of skills provide multiple skills in a posterior setting and provides answers based on skill features. Some methods use a predetermined threshold for returned skill confidence, top k confidence from the answers, and/or skill confidence combined with skill features to heuristically decide skills to return. Posterior orchestration is the selection of a subset of skills to appropriately answer a user input using features extracted from both the user input and the individual skills. To account for the various costs associated with extracting skill features.

An orchestrator may pick a skill that reports a maximum confidence, if the confidence is above a threshold, but may not be able to correct for miscalibrated skills and may not adjust to individual users. Contextual Bandits and reinforcement learning learn which skill to select or learn a normalizer over the skill distribution using a context (e.g., task the user is working on, the command typed in by the user, standard output (stdout)/standard error message (stderr) and user feedback (e.g., whether the user picked up on the assistance).

The inputs of the command line orchestration component may be set of AI skills or plugins (e.g., referred to as command line plugins) with self-determined confidence. Users may provide feedback. A user either selects an option to directly map to a reward function, or the user picks a suggestion (in the post-process step of previous command) in a command. Text similarity between the suggestion and user action can be used to estimate a reward. One or more skills to forward to the end user may then be output.

A priori orchestration acts as a filter and decides which skill to apply based on an input, resulting in a smaller system footprint, but with a single bottleneck based on the accuracy of the classifier which determines which plugin to invoke. Furthermore, the orchestrator design is aware of the list of plugins and the capabilities of the plugins. Posterior orchestration provides the ability for the skills to listen and respond, and lets the orchestrator pick a response. Despite increased latency and computational load, posterior orchestration keeps the skill design process independent from the command line orchestration component as long as the confidences are well calibrated.

The orchestrator has the capability to learn and adapt to different user preferences, such as ignoring any assistance from plugins, or ignoring a particular plugin over others.

An apparatus (e.g., device 105) for a command line interface with artificial intelligence integration is described. Embodiments of the apparatus include a command line interface configured to receive text input from a user, a plurality of command line plugins configured to provided candidate responses to the text input, and a command line orchestration component configured to select a response to the text input from among the candidate responses based on user preferences.

A system for a command line interface with artificial intelligence integration is described. The system includes a command line interface configured to receive text input from a user, a plurality of command line plugins configured to provided candidate responses to the text input, and a command line orchestration component configured to select a response to the text input from among the candidate responses based on user preferences.

A method of manufacturing an apparatus for a command line interface with artificial intelligence integration is described. The method includes manufacturing a command line interface configured to receive text input from a user, manufacturing a plurality of command line plugins configured to provided candidate responses to the text input, and manufacturing a command line orchestration component configured to select a response to the text input from among the candidate responses based on user preferences.

A method of using an apparatus for a command line interface with artificial intelligence integration is described. The method includes using a command line interface configured to receive text input from a user, using a plurality of command line plugins configured to provided candidate responses to the text input, and using a command line orchestration component configured to select a response to the text input from among the candidate responses based on user preferences.

In some examples, the command line orchestration component comprises a reinforcement learning model. In some examples, the plurality of command line plugins includes a command line interpreter. In some examples, the command line orchestration component is configured to prompt the user to accept or reject the selected response, wherein parameters of the command line orchestration component are fine-tuned based on the prompting.

Figure 2:
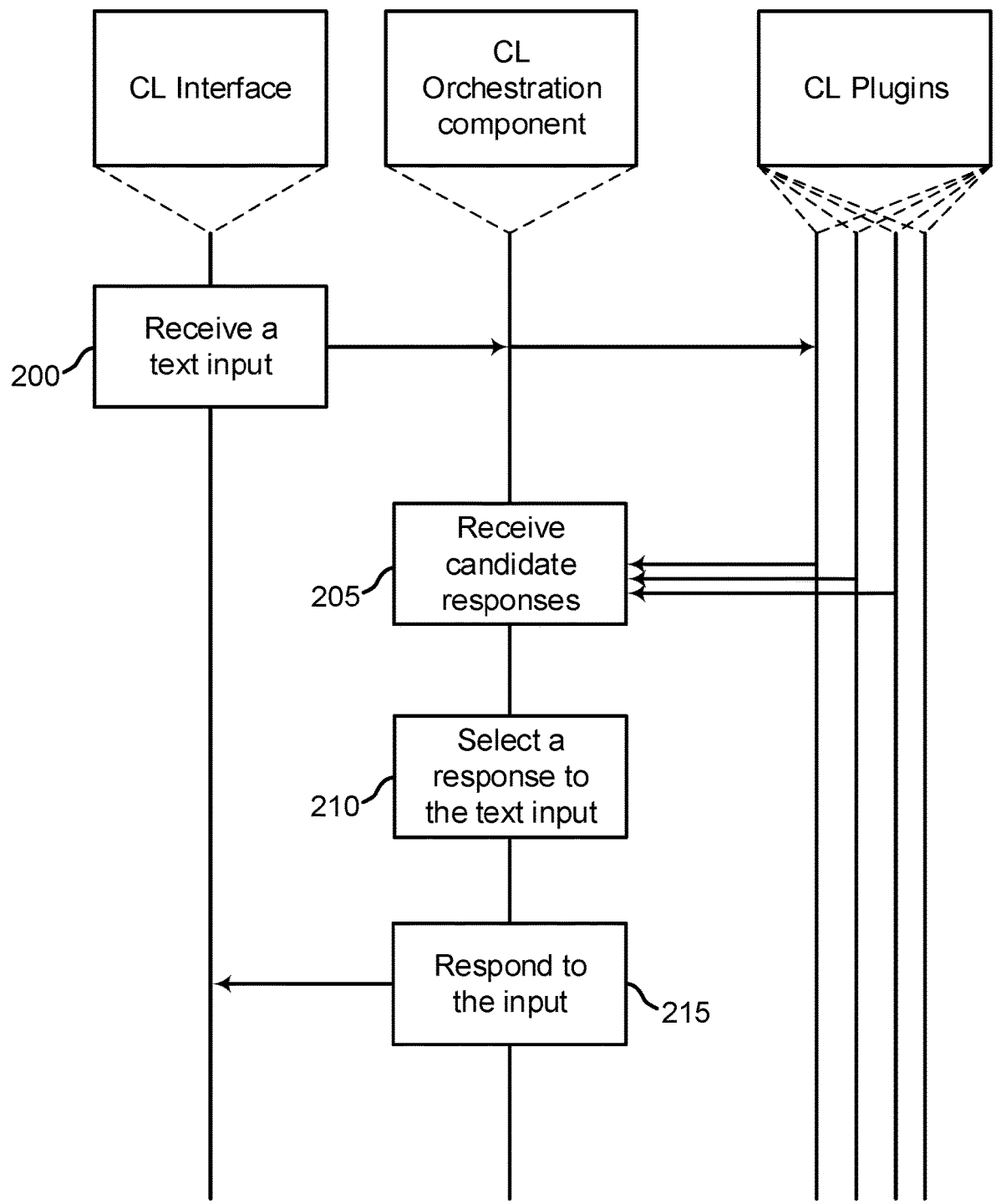
FIG. 2 shows an example of a process for a command line interface system according to aspects of the present disclosure.

FIG. 2 shows an example of a process for a command line interface system according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for a command line interface with artificial intelligence integration is described. Embodiments of the method are configured to receive a text input from a user via a command line interface and receive candidate responses to the text input from a plurality of command line plugins. Embodiments of the method are further configured to select a response to the text input from among the candidate responses based on user preferences using a command line orchestration component comprising a reinforcement learning model and respond to the input based on the selected response.

At operation 200, the system receives a text input from a user via a command line interface. In some cases, the operations of this step refer to, or may be performed by, a command line interface as described with reference to FIG. 1.

At operation 205, the system receives candidate responses to the text input from a set of command line plugins. In some cases, the operations of this step refer to, or may be performed by, a command line orchestration component as described with reference to FIG. 1.

At operation 210, the system selects a response to the text input from among the candidate responses based on user preferences using a command line orchestration component including a reinforcement learning model. In some cases, the operations of this step refer to, or may be performed by, a command line plugin as described with reference to FIG. 1.

At operation 215, the system responds to the input based on the selected response. In some cases, the operations of this step refer to, or may be performed by, a command line plugin as described with reference to FIG. 1.

The command line interface is a popular and powerful tool. The command line interface can be used for plugins and scripts to assist in a user experience. In some examples (e.g., absent techniques described herein), the command line may be difficult to use in some scenarios. The command line orchestration component of the present disclosure is an artificial intelligence support infrastructure on the command line with a catalog of skills (e.g., or command line plugins). In some embodiments, command line artificial intelligence integration (e.g., via the command line orchestration component) that is described herein does not deviate from a command line interface experience to maintain familiarity.

Embodiments of the present disclosure may be used for adapting assistance on the command line to the preferences of the end user. Additionally, the present disclosure may have access to a set of AI skills or plugins (e.g., in some cases referred to as command line plugins) and to user activity on a command line interface. A reinforcement learning agent may be built to learn the mapping of user activities and responses to decide when and how to invoke skills. In some examples, life on the command line is not ruined. In some examples, each command line interface instance can be personalized (e.g., trained on individual data through interactions) to individual users. In some examples, command line interfaces can be shipped catering to different user personas, for example, depending on user expertise, user interest, user job or occupation, user experience, etc. (e.g., trained on large data) that end users can choose from.

Command Line Artificial Intelligence System

The command line orchestration component of the present disclosure uses command line plugins (e.g., AI plugins or skills) that monitor user actions on the command line interface, where a skill is a function that performs microtasks. Commands that a user types, or any execution process on the command line interface, is directed through the active skills in command line orchestration component. Therefore, a skill can autonomously respond to any event on the command line interface.

A user-persona of the command line orchestration component is the developer/researcher who creates the skills. The present disclosure makes a command line interface interpreter available to a developer via a generic environment API, so the developer may not deal with incorrect interfacing and can instead focus on building command line plugins (e.g., AI plugins or skills). The interface provides the ability to execute actions and sense the result of those actions. Therefore, the API makes the command line interface interpreter available for AI agents, such as OpenAI Gym. The command line orchestration component API includes a skill API and an orchestration API.

The skill API lets a developer intercept and execute a callback on user inputs on the command line and lets the user respond appropriately. Developers may do nothing and let the command line follow, including doing nothing but registering an event to learn from that event and/or track user state. Developers may also add information to the user input (e.g., a flag that would make a command work) and replace the user input with other information (e.g., respond to a natural language request for automation). Additionally, developers may respond to the outcome (e.g., error) of a user command for in-situ support and troubleshooting and add something to the outcome (e.g., for proactive support or pedagogical processes).

A state object contains information about the system, such as the state of the shell, system memory, connectivity, file system, etc., as the state information or percept received from the command line interface session that a skill is plugged into.

An action object is a directive from the skill to the command line interface, which includes a suggested command, a description and an explanation for the suggestion, and other control parameters to control the user action (such as permissions to execute). The skill can also return a sequence of Action objects in response to a user command or command line interface event to complete a process based on a user's intent.

The orchestration API provides an assistant, where the assistant is realized in the form of an orchestrated set of skills, where the active skills communicate with the command line orchestration component for deciding whether to pass on individual responses to the command line interface. The orchestrator API provides a contract between the command line interface and the skills. Events are reported to the active skills in the form of a state object. Skills respond with an action object (or a list of action objects) with an associated confidence (self-determined by the skill) of a relevance and/or accuracy. The act-and-sense cycle provides the ability for an AI agent plugged into the command line interface to act and learn over continued periods, either by itself or by prolonged interaction with the user.

Interaction Patterns

In some examples, the techniques described herein support CLAI in the background. Another user-persona (the actual user of the command line) has three ways of using the command line orchestration component skills. In the first mode, a user input may closely resemble normal life on a command line interface. The user experience is entirely unchanged for some or all commands. When a skill is not used, the user may experience the following interfacing pattern.

The command line orchestration component of the present disclosure may replace or augment the user input command to make execution work as the user likely intended. Users see the augmented or altered input command and may approve the input variant for execution or ask for an explanation on the command substitution rationale. Therefore, for example, a mistake in the command may be fixed on the fly or a natural language input may be translated on the command line (e.g., to a shell syntax).

The CLAI described herein may add additional information to the output (e.g., stdout) and the additional information may be used, for example, for pedagogical processes (e.g., an improved way to perform a task) or for alerting the user to certain system information. Additionally, the command line orchestration component of the present disclosure may be used to enhance the functionality of command line interface utilities.

The CLAI described herein may respond to error messages (e.g., stderr) by providing additional information for troubleshooting, or by suggesting a fix that the user can follow through on in a next command.

In some examples, the techniques described herein support CLAI explicit invocation. To force assistance from the command line orchestration component of the present disclosure, a user may opt to ask for a response from the command line orchestration component using the syntax below. Doing so may cause the command line orchestration component to respond with relevant skills for context, bypassing the determination of relevance from the command line orchestration component (e.g., ignore low confidence of a response).

In some examples, the techniques described herein support CLAI forced skill invocation. For instance, the user can force a particular skill to respond, regardless of the orchestration pattern (e.g., ignoring a confidence and those of other active skills).

Command Line Plugin Categories

Embodiments of the CLAI described herein may provide natural language support, where the user may interact with the command line in natural language. For example, the user can ask "how do I extract file.bz2" or tell the command line interface to "extract all images from an archive".

Embodiments of the CLAI described herein may be automated for the user to hand off complex tasks (achieved by one or more commands) to the command line orchestration component of the present disclosure (e.g., deployment of an application to the cloud). Writing tedious automation scripts may be avoided and, instead, provide task-dependent automation. A technology match may establish AI techniques such as automated planning and reinforcement learning.

When the command line user encounters an error, the response is to copy the error from the command line interface, go over to a web browser, search on the internet, copy the text for top answer, and return to the command line interface to try the copied text. The in-situ support and troubleshooting pattern of the command line orchestration component brings help from online forums, support communities, and support documentation, directly to the command line interface, so users may not remove themselves from an immediate work context, ensuring the support can be local or personalized to the user's system, immediate, and in-situ without the user losing context.

In certain situations, the command line orchestration component of the present disclosure can anticipate errors and let the user know about those errors (or fix the errors in the background) in advance. For example, a user may free up space on a cloud instance before proceeding to deploy an application. In such cases, the command line orchestration component skills may detect and prevent future errors that the user would otherwise encounter on the standard command line.

The command line orchestration component system of the present disclosure can also provide feedback to the user about the user's proficiency on the command line interface. The feedback may include an alert about new features (e.g., letting the user know that the new way of running Flask applications is»flask <file> when a user types in»python <file>), or retaining and guiding a new user of cloud platforms to becoming familiar with the cloud. This may also involve augmenting the standard functionalities of command line utilities with new capabilities by adding to the standard output new information that may enhance the user experience.

nlc2cmd is the canonical example of a natural language interface to the command line interface and connects to a processor in the backend to interpret user intents. nlc2cmd translates the use intents to popular bash commands like tar, grep, etc. Each command line interface utility corresponds to a separate workspace. Each flag of the utility maps to a specific intent with the parameters being the corresponding entities. Therefore each command is uniquely mapped to a corresponding natural language understanding layer given a main (manual) page.

Manually transforming main pages into NLU workspaces does not scale. Embodiments of the CLAI described herein may integrate an nlc2cmd use case by using an encoder-decoder model for translation from English to a set of command templates. The encoder-decoder model is augmented with an argument filling module that performs template generation followed by program slot filling to fill out the various slots in the command template correctly.

fixit provides help in response to a last executed command by sending back the response from a plugin for the command line. fixit shows how to integrate plugins (e.g., shell plugins) into the command line orchestration component of the present disclosure.

A main page explorer interprets questions in natural language and responds with a relevant command from the main pages installed in the system. The main page explorer also augments a response with a concise description of the main page using the popular tldr plugin. The main page explorer provides both natural language support as well as plugin integration. This agent trains a vectorizer over the retrieved main pages, and uses the cosine similarity between the natural language question and the main page contents to suggest a command.

A howdoi command is similar to the main page explorer, but rather than using manuals, the howdoi command responds with a relevant answer from Unix Stack Exchange. The posts and the highest rated answers are indexed. The query is compared against the index and a relevant post, and an accepted answer is returned. A helpme command is nearly identical to the howdoi command except the helpme command activates when there is a standard error.

Embodiments of the CLAI described herein may ensure that users of the command line do not leave context when a user faces a small error or do not have the syntax memorized, and searches for answers on the internet. The following skills explore much more sophisticated use cases demonstrating how the present disclosure expands to way beyond episodic support and troubleshooting.

An automated version control application helps a developer navigate a local version control setup and a development platform repository from the command line. The automated version control application highlights use cases such as the use of a local natural language layer built on a natural language processor as opposed to calls to external servers in nlc2cmd and tellina3—replicating the nl2cmd use case but with different commands and an illustration of the use of the development platform API to control the online development platform repository (issues, pull requests, etc.) without leaving the command line.

A dataXplore skill is targeted toward making the command line interface easier to adopt and navigate for such data scientists and provides functionalities such as summarizing and plotting. Summarizing utilizes the describe function of a software library to generate a human-readable summary of a specified file and provides the ability for data scientists to quickly examine any data file right from the command line. Plotting builds on the plot function provided by a visualization library and a software library to generate a plot of a given file. Such functionalities illustrate how the present disclosure can be used as a command line interface assistant for data science.

The cloudbot plugin is a stateful agent that can automate tasks, where the execution of a sequence of actions is performed by using automated planning techniques as an instance of the automation use case. The role of the planner here is to generate scripts that would otherwise have to be specified manually—for example, while deploying an application to the cloud. In addition to automating the lengthy deployment pipeline, the serialization standard file to be written manually is generated automatically by the cloudbot by monitoring user activities on the command line interface, pinging the cloud account for the types of services available, and parsing the command text library. Integration of continuous monitoring of a user state may be provided, along with planning recognition to continuously predict a possible intent and re-plan as the user executes commands on a command line interface.

Orchestration Patterns

The command line orchestration component comes with a unique set of challenges. There may be two approaches to orchestrate skills, a priori and posterior. In a priori, the orchestrator acts as a filter and decides which plugin to invoke. In posterior, the plugins listen and respond, and the orchestrator picks a response. The a priori option may have a smaller system footprint, but involves a single bottleneck based on the accuracy of the classifier which determines which plugin to invoke. Furthermore, the orchestrator may be aware of the full list of plugins and capabilities. The posterior option, despite increased latency and computational load, keeps the skill design process independent from the command line orchestration component. Skill confidences can be calibrated over time by learning from user responses to the command line orchestration component actions. The calibration can either be directly from y/n/e responses or indirectly by observing an executed command after a suggestion, and matching that to how similar it is to the suggested course of action.

Rule-based orchestration, such as a max-orchestrator, a threshold-orchestrator, and/or a preference-based orchestrator may be used. The max-orchestrator pools responses from the active skills and passes the response with the highest confidence, above a threshold specified by either the user or the developer, on to the command line. The threshold-orchestrator is the max-orchestrator, but the threshold is bumped up or down based on user feedback. The preference-based orchestrator provides the ability for the user to provide partially ordered preferences above the thresholding-and-max mechanism.

With continued feedback from the end user, orchestration patterns such as learning-based orchestration may be used. For example, orchestration patterns may be used for adapting the assistant to specific users and user types. The command line orchestration component of the present disclosure includes a contextual bandit based orchestrator, which uses the confidences returned by each skill as the context vector and decides which skill should respond to the user command. The user feedback on the orchestration choices is used to reward the contextual bandit model, which in turn provides the ability to adapt to a user. Additionally, to avoid the initial exploration phase which can adversely affect the user experience, the bandit model can be warm-started with a specific user profile.

Four warm-start profiles such as ignore-clai, max-orchestrator, ignore-skill, and/or prefer-skill may be used. ignore-clai warm-starts the orchestrator to ignore some or all command line orchestration component responses. max-orchestrator warm-starts the bandit to select the skill that responds with the maximum confidence.ignore-skill warm-starts the bandit to ignore a particular skill and behave as a max-orchestrator otherwise. prefer-skill warm-starts the bandit for a particular skill over another and is useful in cases where the user has preferences over skills with overlapping domains. For example, a user on a certain command line interface may not have a use for a skill that retrieves data from the another exchange.

An apparatus for a command line interface with artificial intelligence integration is described. The apparatus includes a processor, memory in electronic communication with the processor, and instructions stored in the memory. The instructions are operable to cause the processor to receive a text input from a user via a command line interface, receive candidate responses to the text input from a plurality of command line plugins, select a response to the text input from among the candidate responses based on user preferences using a command line orchestration component comprising a reinforcement learning model, and respond to the input based on the selected response.

A non-transitory computer readable medium storing code for a command line interface with artificial intelligence integration is described. In some examples, the code comprises instructions executable by a processor to receive a text input from a user via a command line interface, receive candidate responses to the text input from a plurality of command line plugins, select a response to the text input from among the candidate responses based on user preferences using a command line orchestration component comprising a reinforcement learning model, and respond to the input based on the selected response.

A system for a command line interface with artificial intelligence integration is described. Embodiments of the system are configured to receive a text input from a user via a command line interface, receive candidate responses to the text input from a plurality of command line plugins, select a response to the text input from among the candidate responses based on user preferences using a command line orchestration component comprising a reinforcement learning model, and respond to the input based on the selected response. For example, in some cases, the response from command line plugins may be selected based on learned user preferences (i.e., based on a reinforcement learning model).

Some examples of the method, apparatus, non-transitory computer readable medium, and system described above further include identifying the command line plugins. Some examples further include transmitting the text input to each of the command line plugins. Some examples of the method, apparatus, non-transitory computer readable medium, and system described above further include identifying the command line plugins from a plurality of installed command line plugins. Some examples further include refraining from transmitting the text input to at least one of the installed command line plugins. For example, in some cases, the text input may be withheld from command line plugins based on learned user preferences (i.e., based on a reinforcement learning model). Some examples of the method, apparatus, non-transitory computer readable medium, and system described above further include presenting the selected response to the user as a text response via the command line interface.

Some examples of the method, apparatus, non-transitory computer readable medium, and system described above further include identifying a software program based on the selected response. Some examples further include executing the software program. Some examples of the method, apparatus, non-transitory computer readable medium, and system described above further include obtaining information from a knowledge base based on the text input, wherein the selected response comprises the information. In some examples, the command line plugins include at least one machine learning based command line plugin.

Some examples of the method, apparatus, non-transitory computer readable medium, and system described above further include identifying one or more user characteristics. Some examples further include selecting the command line orchestration component from among a plurality of pre-trained models based at least in part on the user characteristics. In some examples, the pre-trained models comprise at least one power user model and at least one casual user model.

Some examples of the method, apparatus, non-transitory computer readable medium, and system described above further include prompting the user to accept or reject the selected response. Some examples further include receiving an indication from the user based on the prompting, wherein the responding is based on the indication. Some examples of the method, apparatus, non-transitory computer readable medium, and system described above further include updating parameters of the command line orchestration component based on the indication.

Figure 3:
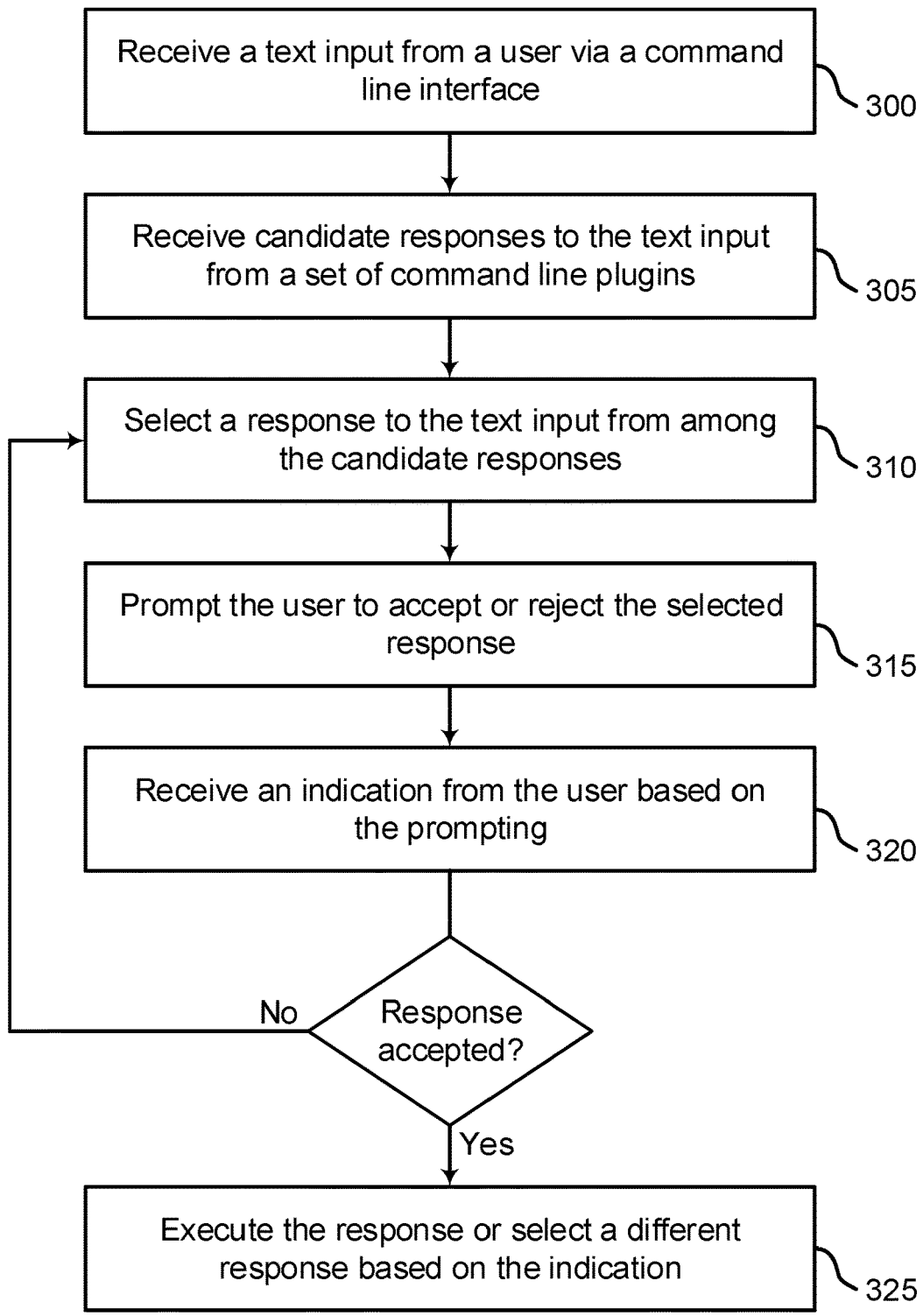
FIGS. 3 through 5 show examples of a process for a command line interface with artificial intelligence integration according to aspects of the present disclosure.

FIG. 3 shows an example of a process for a command line interface with artificial intelligence integration according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 300, the system receives a text input from a user via a command line interface. In some cases, the operations of this step refer to, or may be performed by, a command line interface as described with reference to FIG. 1.

At operation 305, the system receives candidate responses to the text input from a set of command line plugins. In some cases, the operations of this step refer to, or may be performed by, a plugin library as described with reference to FIG. 1.

At operation 310, the system selects a response to the text input from among the candidate responses based on user preferences using a command line orchestration component including a reinforcement learning model. In some cases, the operations of this step refer to, or may be performed by, a command line orchestration component as described with reference to FIG. 1.

At operation 315, the system prompts the user to accept or reject the selected response. In some cases, the operations of this step refer to, or may be performed by, a command line interface as described with reference to FIG. 1.

At operation 320, the system receives an indication from the user based on the prompting. For example, the indication may be either an indication that the response selected by the command line orchestration component is accepted by the user or an indication that the response selected by the command line orchestration component is rejected by the user (e.g., based on whether the response selected by the command line orchestration component is the response the user intended to receive or execute based on the text input from the user at operation 300). In some cases, the operations of this step refer to, or may be performed by, a command line interface as described with reference to FIG. 1.

In cases where the user indicates the response selected by the command line orchestration component at operation 310 is rejected, the system may select a different response (e.g., the system may revert to or loop back to operation 310). In some examples where the user rejects the response selected by the command line orchestration component, the system may repeat operations 310, 315, and 320 (e.g., selecting different responses at operation 310 each iteration) until an indication that the response is accepted by the user is received at operation 320. Additionally or alternatively, in some cases, if the response is not accepted, a response may be executed by a traditional command line interpreter (which may be considered as a default plugin) or a different response may be selected based on the indication.

In cases where the user indicates the response selected by the command line orchestration component at operation 310 is accepted, the system executes the response at operation 325. In some examples, the system may identify a software program based on the selected response and the system may execute the identified software program. In some cases, the operations of step 325 refer to, or may be performed by, an operating system, one or more software applications, or both, as described with reference to FIG. 1.

Figure 4:
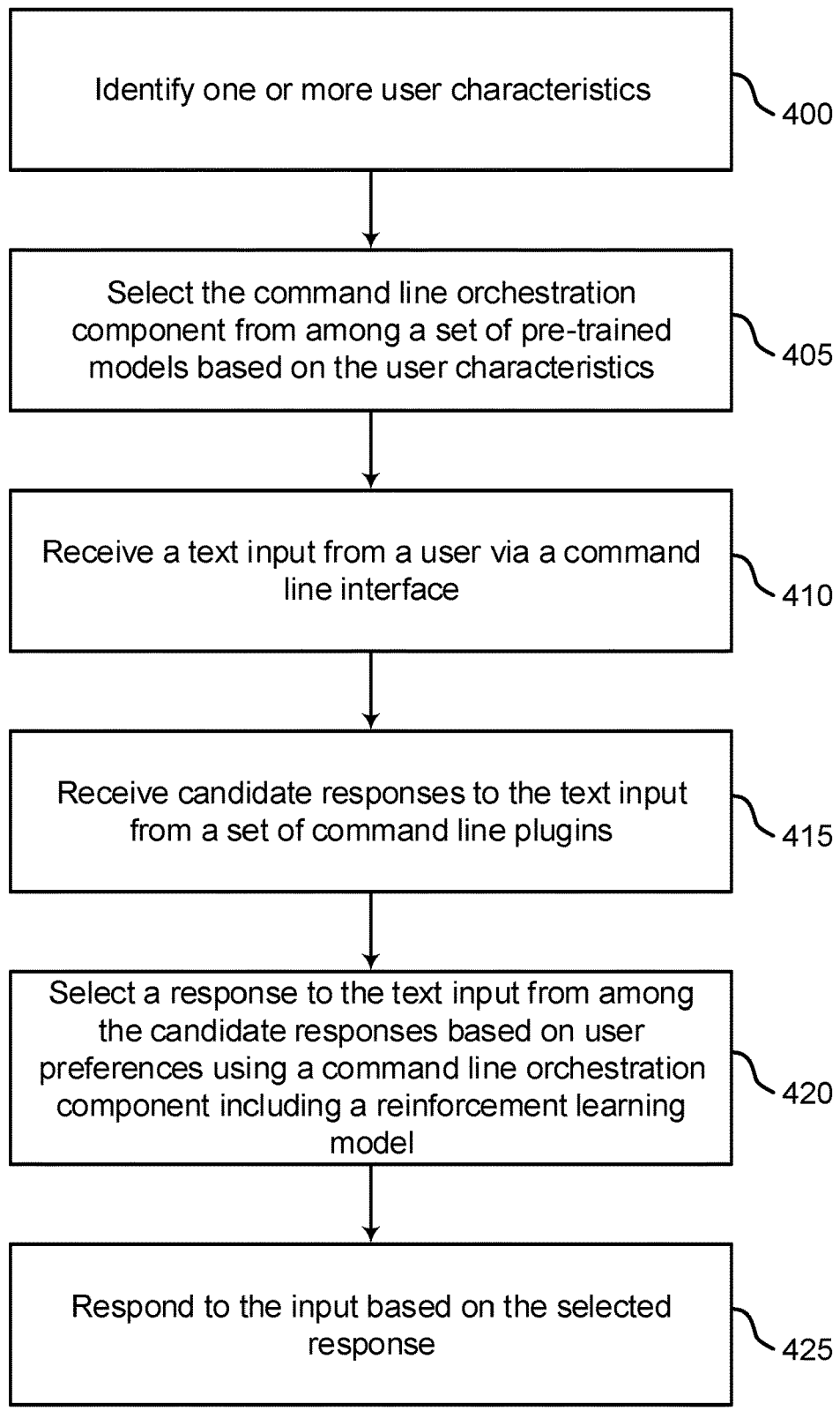

FIG. 4 shows an example of a process for a command line interface with artificial intelligence integration according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 400, the system identifies one or more user characteristics. In some cases, the operations of this step refer to, or may be performed by, a command line plugin as described with reference to FIG. 1.

At operation 405, the system selects the command line orchestration component from among a set of pre-trained models based on the user characteristics. In some cases, the operations of this step refer to, or may be performed by, a command line plugin as described with reference to FIG. 1.

At operation 410, the system receives a text input from a user via a command line interface. In some cases, the operations of this step refer to, or may be performed by, a command line interface as described with reference to FIG. 1.

At operation 415, the system receives candidate responses to the text input from a set of command line plugins. In some cases, the operations of this step refer to, or may be performed by, a command line orchestration component as described with reference to FIG. 1.

At operation 420, the system selects a response to the text input from among the candidate responses based on user preferences using a command line orchestration component including a reinforcement learning model. In some cases, the operations of this step refer to, or may be performed by, a command line plugin as described with reference to FIG. 1.

At operation 425, the system responds to the input based on the selected response. In some cases, the operations of this step refer to, or may be performed by, a command line plugin as described with reference to FIG. 1.

Figure 5:
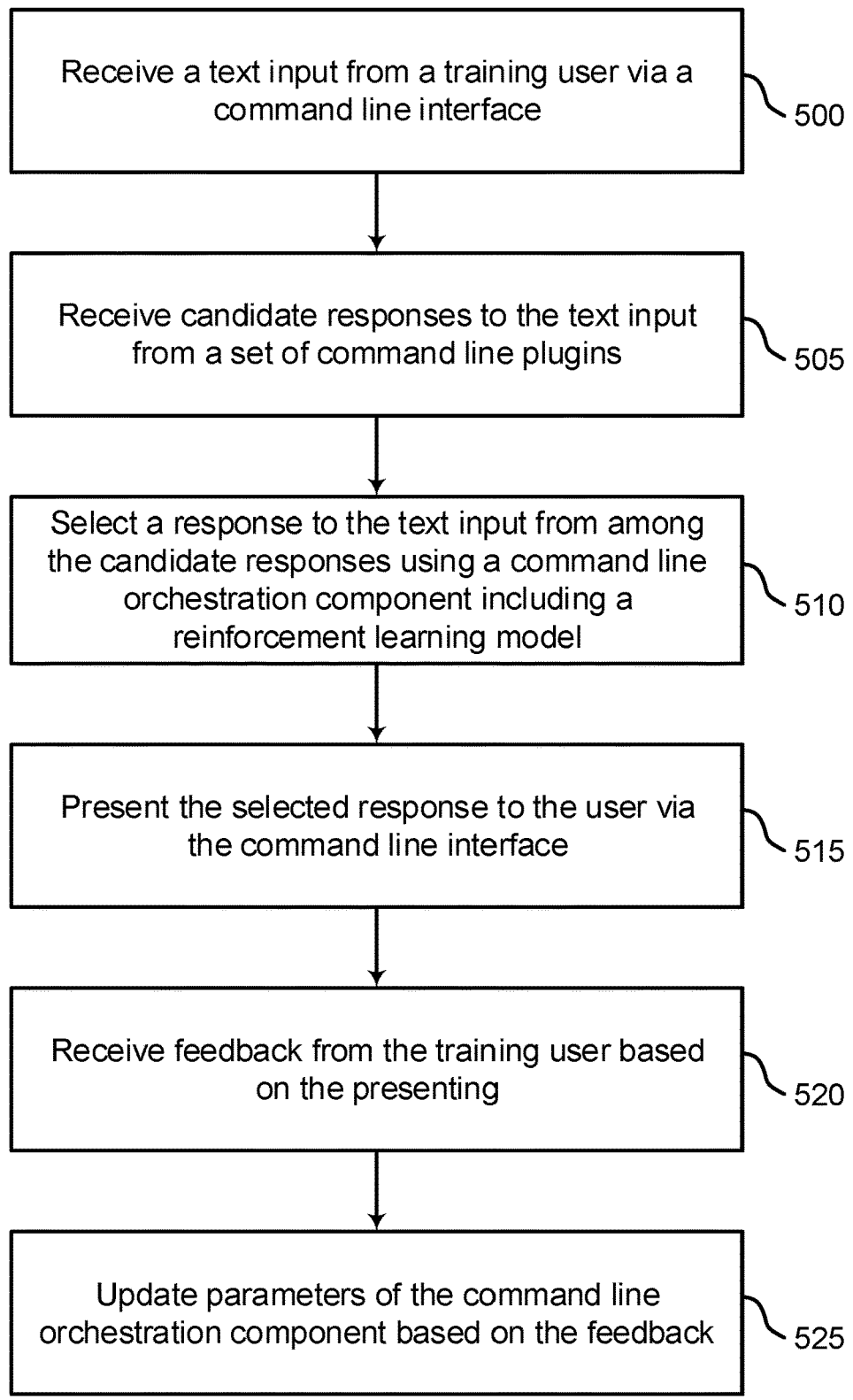

FIG. 5 shows an example of a process for training a command line interface with artificial intelligence integration according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for a command line interface with artificial intelligence integration is described. Embodiments of the method are configured to receive a text input from a training user via a command line interface, receive candidate responses to the text input from a plurality of command line plugins, select a response to the text input from among the candidate responses using a command line orchestration component comprising a reinforcement learning model, present the selected response to the user via the command line interface, receiving feedback from the training user based on the presenting, and update parameters of the command line orchestration component based on the feedback.

At operation 500, the system receives a text input from a training user via a command line interface. In some cases, the operations of this step refer to, or may be performed by, a device as described with reference to FIG. 1.

At operation 505, the system receives candidate responses to the text input from a set of command line plugins. In some cases, the operations of this step refer to, or may be performed by, a device as described with reference to FIG. 1.

At operation 510, the system selects a response to the text input from among the candidate responses using a command line orchestration component including a reinforcement learning model. In some cases, the operations of this step refer to, or may be performed by, a device as described with reference to FIG. 1.

At operation 515, the system presents the selected response to the user via the command line interface. In some cases, the operations of this step refer to, or may be performed by, a device as described with reference to FIG. 1.

At operation 520, the system receives feedback from the training user based on the presenting. In some cases, the operations of this step refer to, or may be performed by, device as described with reference to FIG. 1.

At operation 525, the system updates parameters of the command line orchestration component based on the feedback. In some cases, the operations of this step refer to, or may be performed by, a device as described with reference to FIG. 1.

An apparatus for a command line interface with artificial intelligence integration is described. The apparatus includes a processor, memory in electronic communication with the processor, and instructions stored in the memory. The instructions are operable to cause the processor to receive a text input from a training user via a command line interface, receive candidate responses to the text input from a plurality of command line plugins, select a response to the text input from among the candidate responses using a command line orchestration component comprising a reinforcement learning model, present the selected response to the user via the command line interface, receive feedback from the training user based on the presenting, and update parameters of the command line orchestration component based on the feedback.

A non-transitory computer readable medium storing code for a command line interface with artificial intelligence integration is described. In some examples, the code comprises instructions executable by a processor to: receive a text input from a training user via a command line interface, receive candidate responses to the text input from a plurality of command line plugins, select a response to the text input from among the candidate responses using a command line orchestration component comprising a reinforcement learning model, present the selected response to the user via the command line interface, receive feedback from the training user based on the presenting, and update parameters of the command line orchestration component based on the feedback.

A system for a command line interface with artificial intelligence integration is described. Embodiments of the system are configured to receive a text input from a training user via a command line interface, receive candidate responses to the text input from a plurality of command line plugins, select a response to the text input from among the candidate responses using a command line orchestration component comprising a reinforcement learning model, present the selected response to the user via the command line interface, receiving feedback from the training user based on the presenting, and update parameters of the command line orchestration component based on the feedback.

Some examples of the method, apparatus, non-transitory computer readable medium, and system described above further include computing a reward function based on the feedback, wherein the parameters are updated based on the reward function (i.e., the training may be performed according to a reinforcement learning model). In some examples, the reinforcement learning model comprises a contextual bandit model.

Some examples of the method, apparatus, non-transitory computer readable medium, and system described above further include receiving additional feedback from an end user. That is, a reinforcement learning network may be trained initially based on feedback from one or more training users, and then provided to an end user and the continually trained based on feedback from the end user. Some examples further include tuning the command line orchestration component based on the additional feedback (i.e., from the end user). In some cases, the initial training may include training by various types of users, and different versions of the orchestration layer may be available by selection by the end user (i.e., a power user version and a new user version). Once the end user selects the version they prefer initially, further training may then fine tune the reinforcement learning network to their specific preferences.

Some examples of the method, apparatus, non-transitory computer readable medium, and system described above further include determining that a user category of the end user corresponds to a user category of the training user. Some examples further include selecting the command line orchestration component for the end user based on the determination. The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
identifying one or more user characteristics;
selecting a command line orchestration component from among a plurality of pre-trained models based at least in part on the user characteristics;
receiving a text input from a user via a command line interface;
receiving candidate responses to the text input from a plurality of command line plugins;
selecting a response to the text input from among the candidate responses based on user preferences using the selected command line orchestration component comprising a reinforcement learning model; and
responding to the input based on the selected response.

2. The method of claim 1, further comprising:
identifying the command line plugins; and
transmitting the text input to each of the command line plugins.

3. The method of claim 1, further comprising:
identifying the command line plugins from a plurality of installed command line plugins; and
refraining from transmitting the text input to at least one of the installed command line plugins.

4. The method of claim 1, wherein responding the text input comprises:
presenting the selected response to the user as a text response via the command line interface.

5. The method of claim 1, wherein responding the text input comprises:
identifying a software program based on the selected response; and
executing the software program.

6. The method of claim 1, further comprising:
obtaining information from a knowledge base based on the text input, wherein the selected response comprises the information.

7. The method of claim 1, wherein:
the command line plugins include at least one machine learning based command line plugin.

8. The method of claim 1, wherein:
the pre-trained models comprise at least one power user model and at least one casual user model.

9. The method of claim 1, further comprising:
prompting the user to accept or reject the selected response; and receiving an indication from the user based on the prompting, wherein the responding is based on the indication.

10. The method of claim 9, further comprising:
updating parameters of the command line orchestration component based on the indication.

11. An apparatus comprising:
a processor and a memory storing instructions and in electronic communication with the processor, the processor being configured to execute the instructions to:
receive, via a command line interface, text input from a user;
provide, via a plurality of command line plugins, candidate responses to the text input; and
select, via a command line orchestration component, a response to the text input from among the candidate responses based on user preferences, wherein the command line orchestration component is selected based at least in part on one or more user characteristics.

12. The apparatus of claim 11, wherein:
the command line orchestration component comprises a reinforcement learning model.

13. The apparatus of claim 11, wherein:
the plurality of command line plugins includes a command line interpreter.

14. The apparatus of claim 11, wherein:
the command line orchestration component is configured to prompt the user to accept or reject the selected response, wherein parameters of the command line orchestration component are fine-tuned based on the prompting.

15. A method of training a machine learning model, the method comprising
receiving a text input from a training user via a command line interface;
receiving candidate responses to the text input from a plurality of command line plugins;
selecting a response to the text input from among the candidate responses using a command line orchestration component comprising a reinforcement learning model;
presenting the selected response to the user via the command line interface;
receiving feedback from the training user based on the presenting; and
updating parameters of the command line orchestration component based on the feedback, wherein the reinforcement learning model uses a context and the received feedback to learn skill information for responding to subsequent text input received via the command line interface,
receiving additional feedback from an end user;
tuning the command line orchestration component based on the additional feedback;
determining that a user category of the end user corresponds to a user category of the training user; and
selecting the command line orchestration component for the end user based on the determination.

16. The method of claim 15, further comprising:
computing a reward function based on the feedback, wherein the parameters are updated based on the reward function.

17. The method of claim 15, further comprising:
the reinforcement learning model comprises a contextual bandit model.

* * * * *